(No Model.)

A. J. NELLIS.

HORSE HAY FORK.

No. 298,769.

2 Sheets—Sheet 1.

Patented May 20, 1884.

WITNESSES:
W. A. Jones
E. T. Walkers

INVENTOR
Aaron J. Nellis
by F. W. Ritter Jr.
atty

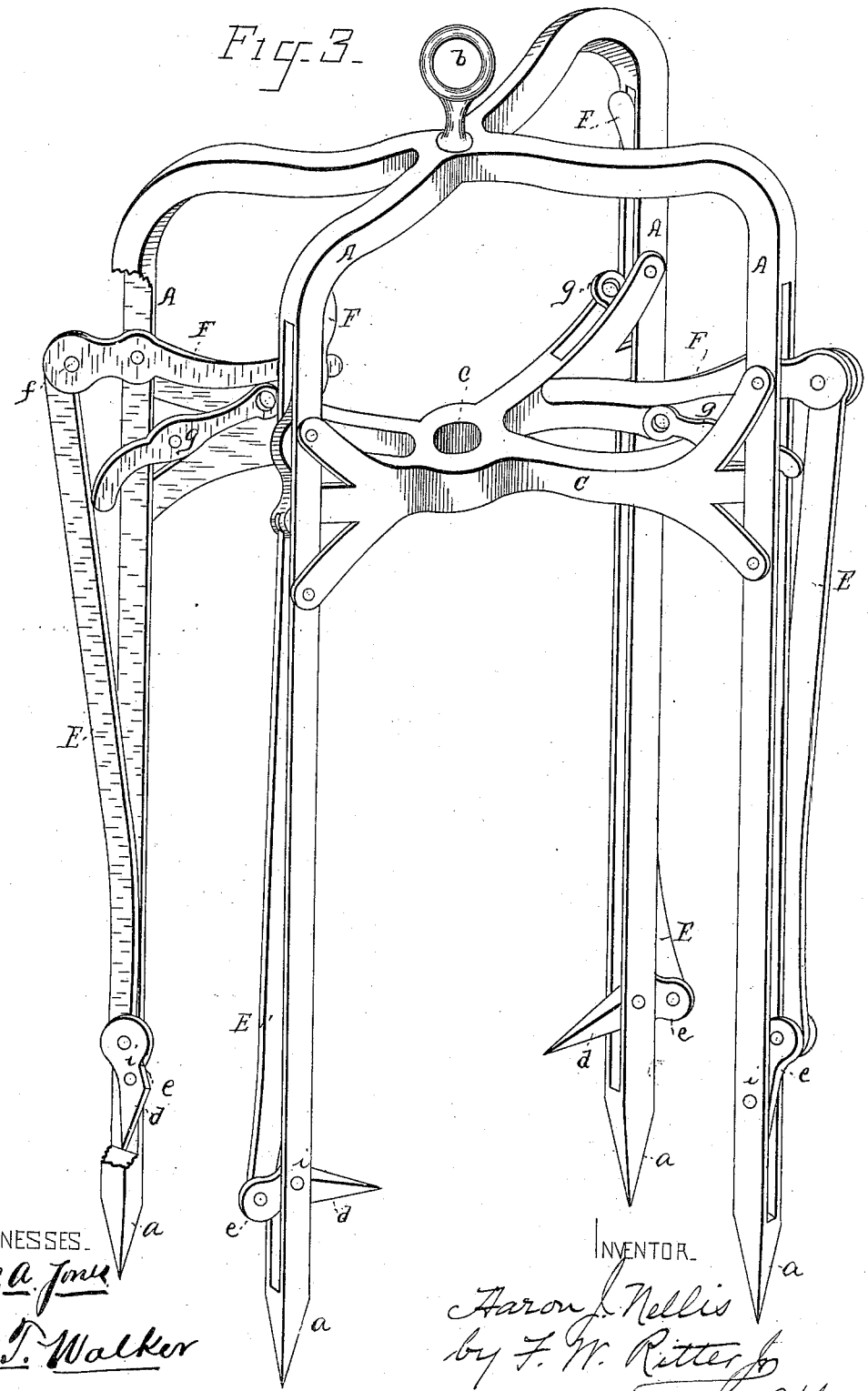

UNITED STATES PATENT OFFICE.

AARON J. NELLIS, OF PITTSBURG, PENNSYLVANIA.

HORSE HAY-FORK.

SPECIFICATION forming part of Letters Patent No. 298,769, dated May 20, 1884.

Application filed October 19, 1883. (No model.)

*To all whom it may concern:*

Be it known that I, AARON J. NELLIS, a citizen of the United States, residing at Pittsburg, in the county of Allegheny and State of Pennsylvania, have invented certain new and useful Improvements in Horse Hay-Forks; and I hereby declare the following to be a full, clear, and exact description of the same, reference being had to the accompanying drawings, in which—

Figure 1:
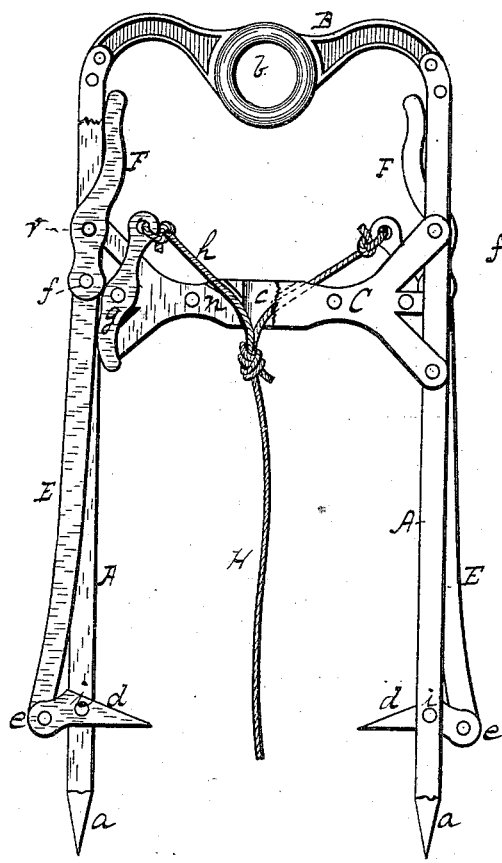
Figure 2:
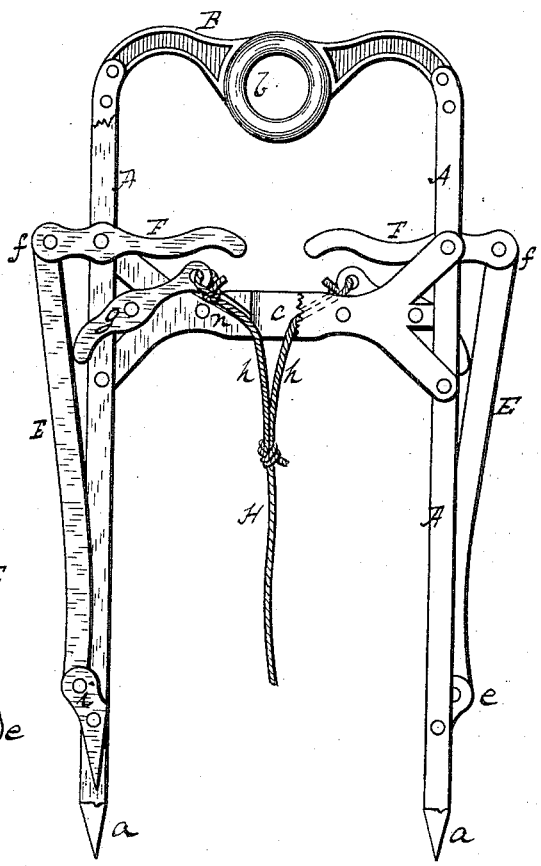

Figure 1 is an elevation, partly in section, showing the fork in position for lifting and conveying its load. Fig. 2 is a similar view showing the fork just after the load has been discharged and when in position for being forced into a new load. Fig. 3 is a view of quadruple or multiple sheath fork.

Like letters refer to like parts wherever they occur.

My invention relates to that class of horse hay-forks generally termed "harpoon-forks," wherein is combined with a sheath for entering the hay one or more pivoted projecting barbs for retaining the hay upon the fork, and has for its object to simplify the devices and facilitate the disengagement of the barbs from the hay when the load is to be discharged, to increase the control over the barb-levers, and protect the trip-rope against accidental drafts, which would tend to discharge the load.

To this end it consists, mainly, in pivoting the barb directly to the connecting-bar and to the hand-lever, by which it is actuated, and combining therewith a trip-dog pivoted on the sheath and acting on the connecting-bar to force the same off its center, all as will hereinafter more fully appear, whereby the force required to unlock the barbs and discharge the load is reduced to the minimum. The general constructions heretofore devised and employed for this purpose may be briefly stated to be of three general characters, first, those wherein the barbs were tripped by a trip-rope acting directly on the hand-lever by which the barbs were set when the sheaths had been forced into the hay; secondly, those wherein the connecting-bar or the hand-lever, as the case may be, was locked by a pawl or dog after the barbs were set, and released by a trip-rope acting on the dog to release the connecting-bar; thirdly, those wherein the barb is controlled by a sliding bar or rod actuated by toggle-levers, tripped by a dog pivoted on the toggle-levers, which several forms of construction are distinctly disclaimed.

Having pointed out broadly the characteristics of my present invention, and the points wherein it is distinct from what has preceded it, I will now specifically describe the same so that others skilled in the art to which it appertains may apply the same. For the purposes of illustrations I have shown it in detail, as applied to a twin fork; but it is evident that it is equally applicable, to a certain extent, to a single-tine or single-sheath fork, or to a multiple-sheath fork.

A indicates the sheath, of which two or more may be employed, connected above by a bow, B, to which the hoist-rope may be attached at $b$, and braced lower down by a cross or brace bar, C, wherein I prefer to form a single guide-hole, $c$, for the passage of the trip-rope. The lower end of the sheaths A are pointed, as at $a$, in order that the same may penetrate or be readily forced into the hay, and at a point just above the points $a$ are each provided with a barb, $d$, so pivoted on the sheath, as at $i$, that the barb may be drawn in or concealed.

E indicates the connecting-bar, by which the barb is operated. It is pivoted below to the heel of the barb, as at $e$, and above, as at $f$, to a hand-lever, F, by which it is operated to set the barbs $d$. The length and shape of the connecting-bar E is such that when the hand-lever F is thrown up to set the barbs $d$, the pivoted connection $f$ and the pivot $i$ of the barb $d$ is locked, and the bar E may be said to be on its center. While in this position no weight brought to bear on the barbs $d$ will rotate them.

Pivoted on the cross or brace bar C, when the same is used, next to the sheath, or on the sheath A, if preferred, are tripping-dogs $g$, provided at their upper ends with eyes or other means for attaching the trip-rope $h$. The dogs $g$ stand substantially parallel with the sheath A when the barbs $d$ are set, or in the position shown in Fig. 1; but by a pull on the trip-rope is forced out at an angle to the sheath A, as shown in Fig. 2, and striking against the connecting-bar E forces it off its center, thus unlocking the barb $d$ and permitting it to retract or enter the sheath A.

The trip-rope $h$ in a single-sheath fork may pass to an eye or pulley on a bracket-arm projecting from the sheath; but where a twin or multiple fork connected by a cross-bar, as shown, is used, it will preferably pass through a channel, $n$, into a guide-hole, $c$, where it will unite with its fellows from the opposite side to form the main trip-rope H.

The devices, being substantially such as described, will operate as follows: The fork, having its barbs concealed, (as in Fig. 2,) is forced into the hay, to be lifted until the sheaths A have penetrated the desired distance, the hand-levers F are pulled into the position shown in Fig. 1, which projects the barbs and brings the connecting-bar E substantially in line with the sheath and between the pivot-points $f$ and $i$, so as to lock the barbs. The dogs $g$ stand in the position shown in Fig. 1, or substantially parallel with the connecting-bar E. When the fork with its load has reached the desired point, a pull on trip-rope H will rotate the dogs $g$, which in their movement force the connecting-bar E off its center or from between the pivot-points $i$ $i$, which unlocks the barbs and permits them to rotate under the weight of the hay. As the barbs move into the sheath A, there is nothing to retain the load, which then escapes from the sheath A. The fork thus assumes the position shown in Fig. 2, and is again ready to receive its load.

Having thus fully set forth the nature, object, and advantages of my invention, what I claim, and desire to secure by Letters Patent, is—

1. In a horse hay-fork, the combination of a sheath, a barb pivoted thereon, a hand-lever also pivoted thereon, a connecting-bar pivoted at one end to the barb and at the other to the hand-lever, and a tripping-dog pivoted on the sheath and adapted to act on the connecting-bar to force the same and the hand-lever off their centers, substantially as and for the purposes specified.

2. In a horse hay-fork, the combination of two or more sheaths, each having a hand-lever and a barb both pivoted thereon, a connecting-bar pivoted at one end to the hand-lever and at the other to the barb, and a trip-dog pivoted on the sheath and adapted to act on the connecting-rod to force it and the hand-lever off the center, with a cross or brace bar provided with a central guide-hole to receive the several trip-ropes of the trip-dogs, substantially as and for the purposes specified.

In testimony whereof I affix my signature, in presence of two witnesses, this 4th day of October, 1883.

AARON J. NELLIS.

Witnesses:
JOHN BURTON,
WM. M. MCELROY.